US006795699B1

(12) United States Patent
McCraw et al.

(10) Patent No.: US 6,795,699 B1
(45) Date of Patent: Sep. 21, 2004

(54) GEOLOCATION TECHNIQUES FOR AN AIRBORNE CELLULAR SYSTEM

(75) Inventors: Dawn M. McCraw, Phoenix, AZ (US); Thomas Peter Emmons, Jr., Mesa, AZ (US); Jonathan H. Gross, Gilbert, AZ (US); James F. Berke, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 393 days.

(21) Appl. No.: 09/604,634

(22) Filed: Jun. 27, 2000

(51) Int. Cl.[7] .................. H04M 11/00; H04B 7/185; H04Q 7/20

(52) U.S. Cl. .................. 455/408; 455/13.1; 455/406; 455/427; 455/456.1; 455/456.6; 342/357.08; 342/357.09

(58) Field of Search .................. 455/408, 431, 455/427, 430, 406, 13.1, 13.3, 456.1, 456.6; 342/353, 408, 450, 357.08, 357.09

(56) References Cited

U.S. PATENT DOCUMENTS

| 5,123,112 A | * | 6/1992 | Choate .................. 455/431 |
| 5,519,761 A | * | 5/1996 | Gilhousen .................. 455/431 |
| 5,559,865 A | | 9/1996 | Gilhousen |
| 5,619,211 A | * | 4/1997 | Horkin et al. .......... 342/357.08 |
| 5,974,315 A | * | 10/1999 | Hudson .................. 455/427 |
| 6,018,659 A | * | 1/2000 | Ayyagari et al. .......... 455/431 |
| 6,052,561 A | * | 4/2000 | Rudowicz et al. ......... 455/13.1 |
| 6,061,562 A | * | 5/2000 | Martin et al. .............. 455/431 |
| 6,073,012 A | * | 6/2000 | Vanden Heuvel et al. .. 455/427 |
| 6,377,565 B1 | * | 4/2002 | Puckette, IV .............. 370/337 |

* cited by examiner

Primary Examiner—Simon Nguyen
(74) Attorney, Agent, or Firm—Charles W. Bethards

(57) ABSTRACT

A method of locating a billing area associated with a cell phone call initiated in an airborne cellular communications system enables service providers to more accurately identify system user locations within the system's area of coverage. In operation, propagation delay and beam number location of an initiated call are identified to determine a current handset radial beam location. The propagation delay is then mapped to a stored closest corresponding radial geographic billing location, and the call is then associated with the closest corresponding radial geographic billing location. Additional system accuracy may be provided by determining azimuthal position within a beam footprint by determining a handoff location of a signal from a first beam to a second beam, and then mapping handoff information to a closest corresponding azimuthal geographic billing location. Both the closest corresponding radial and azimuthal geographic billing locations are then used to identify a current handset location. Such a system user location technique also enables an airborne system to comply with FCC E911 caller location requirements.

9 Claims, 5 Drawing Sheets

10

GEOLOCATION TECHNIQUES FOR AN AIRBORNE CELLULAR SYSTEM

FIELD OF THE INVENTION

The present invention relates generally to a cellular communications system including an airborne repeater, and particularly to techniques for locating system users within the system coverage area.

BACKGROUND OF THE INVENTION

The increasing need for communications networks and capabilities in outlying and geographically diverse locations has created greater demand for cellular systems. Many new carriers providing the infrastructure for such systems have focused their resources on building as many terrestrial cell stations as possible to expand their respective areas of coverage and consequently generate more revenue.

However, the buildout rate for the terrestrial cell stations is typically slow and expensive, especially in mountainous or otherwise difficult to access areas. In addition, in some these areas, a carrier's return on investment may not provide the incentive necessary for the carrier to build the necessary cell stations, thereby leaving these areas with either limited or no cellular service at all. Further, many areas having a sufficient number of cellular communications base transceiving stations to handle calls during both off-peak and peak times cannot adequately handle large volumes of calls during sporting events or other short-term special events that temporarily attract large crowds.

In response to the above, airborne cellular systems have been proposed in which a cellular repeater mounted in an airplane flying a predetermined flight pattern over a geographic area requiring cellular coverage links calls from cellular phones within the covered geographic area to a terrestrial base station. Because the airplane is capable of traversing geographic limitations and takes the place of the cell stations, such a system overcomes the above-mentioned limitations of conventional terrestrial cellular systems.

Despite its many advantages, an airborne cellular system presents design and implementation problems not present in the design and implementation of conventional terrestrial cellular systems. For example, service providers must be capable of accurately determining geographic locations of subscribers or roamers within their service areas for billing purposes, for example. In addition, real-time user location will be particularly important in next generation (2.5–3G) systems where data and multi-media services will be prevalent. Advertising will be a key operator revenue stream and location-based services/advertising will be premium. Because cell sites in conventional terrestrial cellular communications systems have very limited propagation ranges, subscriber and roamer locations can be determined rather easily with an accuracy corresponding to the limited ranges of the cell sites. However, because an airborne cellular communications system has a much wider propagation range, determining subscriber and roamer locations within the propagation range of the airborne cellular system presents unique challenges. In addition, accurate determination of geographic locations of subscribers or roamers within their service areas must become an essential feature of all cellular systems in response to a recent emergency 911 (E911) mandate requiring more precise system user location capabilities.

BRIEF DESCRIPTION OF THE DRAWINGS

Advantages of the present invention will be readily apparent from the following detailed description of preferred embodiments thereof when taken together with the accompanying drawings in which.

DETAILED DESCRIPTION OF THE INVENTION

Figure 1:
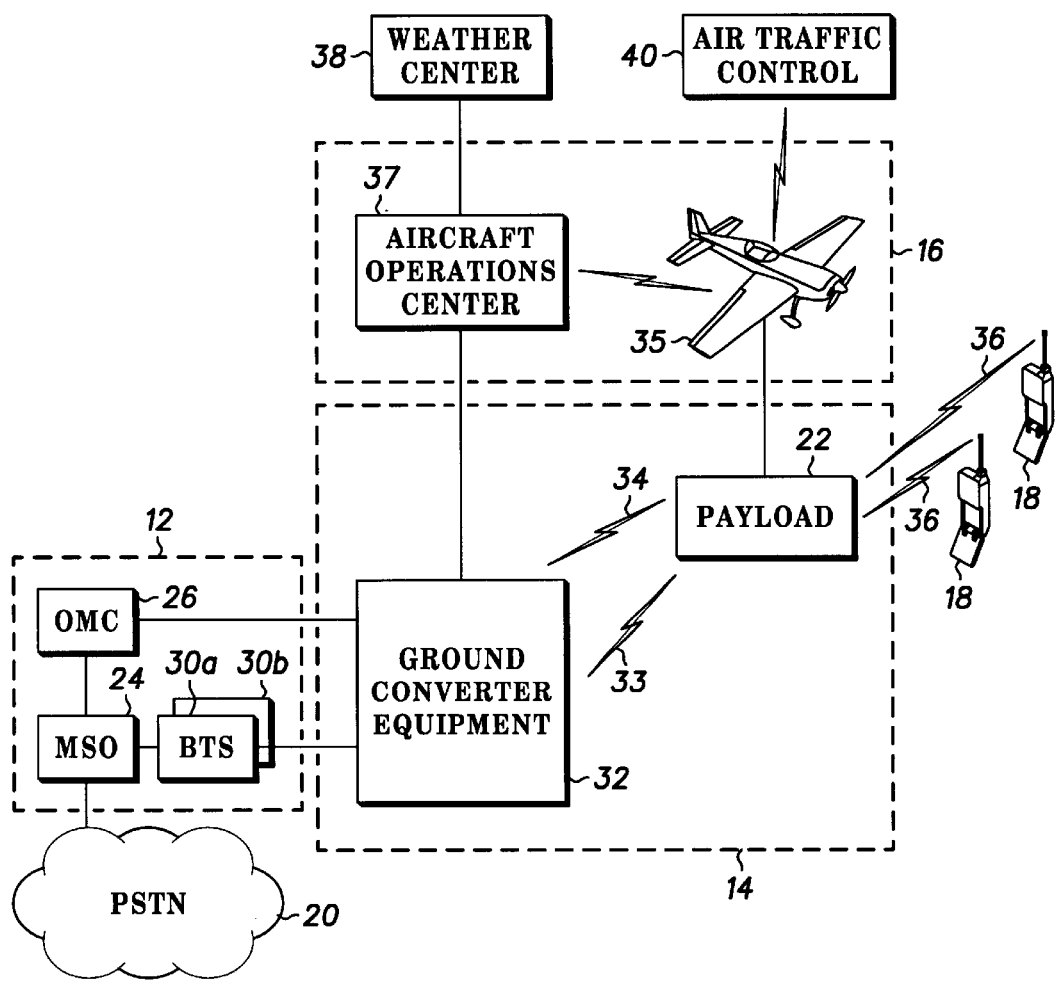
FIG. 1 is a system diagram of an airborne cellular communications system in accordance with the present invention.

Referring now to the drawings in which like numerals reference like parts, FIG. 1 shows an airborne cellular communications system 10. The system 10 generally includes three primary segments: a cellular infrastructure segment 12, a radio infrastructure segment 14, and an airplane segment 16. These three segments in combination are capable of providing cellular communications coverage to a large geographical area by enabling system users, represented generally by handsets 18, to link to a public switched telephone network (PSTN) 20 via an airplane payload 22 including a repeater. The structure and function of each of these three system segments will be discussed in detail.

The cellular infrastructure segment 12 includes a mobile switching office (MSO) 24 that includes equipment, such as a telephony switch, voicemail and message service centers, and other conventional components necessary for cellular service. The MSO 24 connects to the PSTN 20 to send and receive telephone calls in a manner well known in the industry. In addition, the MSO 24 is connected to an operations and maintenance center (OMC) 26 from which a cellular system operator manages the cellular infrastructure segment 12. The MSO 24 is also connected to one or more base transceiver stations (BTSs) such as the BTSs shown at 30a, 30b. The BTSs 30a, 30b transmit and receive RF signals to and from the system users 18 through the radio infrastructure segment 14.

More specifically, the BTS 30 transmits and receives RF signals through ground converter equipment 32. The ground converter equipment 32 converts terrestrial cellular format signals to C-band format signals and communicates with the airborne payload 22 through a feeder link 33 and a telemetry link 34, each of which will be discussed later in detail. The payload 22 establishes a radio link 36 for connecting calls over a wide geographic area of coverage, or footprint, that is capable of exceeding 350 km when the airplane maintains a flight pattern at or around 30,000 feet above the ground.

In addition to the airplane 35, the airplane segment 16 also includes an airplane operations center 37 that controls mission logistics based at least in part on information from sources such as a weather center 38, and manages all system airplanes, as the system preferably includes three airplanes to ensure continuous coverage (one operational, on en route, as required, and one ground spare). The airplane also receives additional routine instructions from sources such as an air traffic control center 40.

Figure 2:
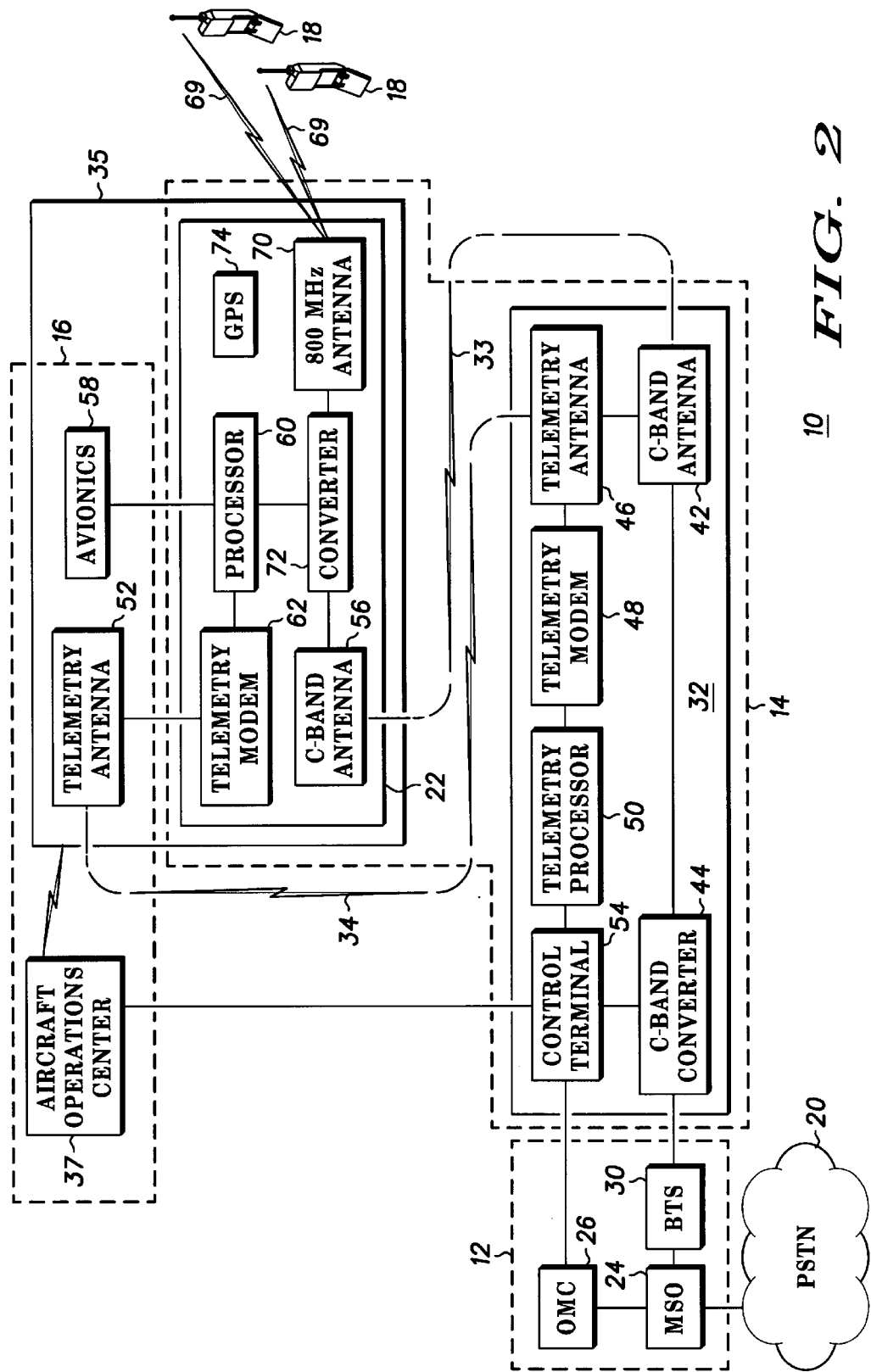
FIG. 2 is a physical block diagram illustrating the components of the airborne cellular communications system shown in FIG. 1 in more detail.

FIG. 2 shows certain components of the system 10 in more detail. Specifically, the ground converter equipment 32 includes a C-band antenna 42 for receiving/transmitting signals from/to the payload 22 (a second antenna is also provided for redundancy and plane handoff purposes), and a C-band converter 44 for appropriately converting the signals received from or to be transmitted to the payload 22. According to a preferred embodiment, the C-band antenna 42 and the converter 44 enable 800 MHz airborne cellular antennas 56 to communicate with the BTSs 30a, 30b via an established downlink, or feeder link, 33, and the converter 44 upconverts nominal signals from the BTSs 30a, 30b to C-band signals before the signals are transmitted to the airplane 35. Also, each sector of each BTS 30a, 30b is assigned a different band in the C-band spectrum so that signals from the different BTSs 30a, 30b can be separated and routed to the correct antenna, such as the antenna 56, at the payload 22. In addition, the ground control equipment 32 includes telemetry components such as a telemetry antenna 46, a telemetry modem 48 and a telemetry processor 50 to receive and process airplane and payload data transmitted from an airplane telemetry antenna 52, while a control terminal 54 controls transmission of the processed telemetry data to the OMC 26 and the airplane operations center 37.

In the airplane segment 16, the airplane telemetry antenna 52 mentioned above transmits airplane avionics data generated by airplane avionics equipment, represented generally at 58, including airplane location, direction and flight pattern data as well as other data such as airplane pitch, roll and yaw data. The data from the airplane avionics equipment 58 is input into and processed by a payload processor 60 before being output to the telemetry antenna 52 through a telemetry modem 62. The payload processor 60 is also responsible for processing signals transmitted to and received from the ground converter equipment 32 through the feeder link 33 established between the C-band antennas 42, 56 and for processing signals transmitted to and received from the system users 18 through a downlink, or user link, 69 established between the users 18 and a payload downlink antenna such as an 800 MHz antenna 70, with the signals received by and transmitted from the payload being appropriately upconverted or downconverted by an 800 MHz converter 72. The payload 22, in addition to including the above-mentioned equipment, also includes GPS equipment 74 that can also be input into the processor 60 and transmitted to the ground converter equipment 32 and sent via landline to the airplane operations center 37 for flight control and/or monitoring purposes. The components shown in the airplane and in the payload together form the airplane repeater that enables cellular coverage to be provided to a ubiquitous large geographic area that may otherwise not support terrestrial cellular coverage because of an insufficient number of cell stations or the like (often driven by economics or topography).

As should be appreciated from the system configuration shown in FIGS. 1 and 2, both the airborne cellular system 10 and conventional terrestrial cellular systems appear identical to the PSTN 20 and the system users 18. In other words, there are no discernable service-related differences between calls linked to the PSTN 20 through the cellular infrastructure, radio infrastructure and airplane segments 12–16 and calls handled through a conventional terrestrial system infrastructure, in part due to the fact that the cellular infrastructure segment 12 includes a standard telephony switch in the MSO 24 and BTSs 30a, 30b that are identical or nearly identical to those included in a conventional terrestrial system infrastructure. Also, the system 10 is designed to meet the performance requirements of standard handsets such as those shown at 18.

Still referring to FIGS. 1 and 2, operation of the components of the airborne cellular system 10 during completion of a call made by one of the system users 18 will now be described. The airplane 35, when on-station preferably flies in a circular or near circular flight pattern (although the flight pattern may vary according to specific weather and coverage conditions) to provide coverage to a predetermined geographic area during a mission. While it is on-station, the airplane maintains contact with the ground converter equipment 32 to provide both the feeder link 33 and the user link 36 for the cellular infrastructure segment 12 through the radio infrastructure equipment segment 14. The airplane 35 also transmits a predetermined number of communications beams, such as, for example, 13 beams, over the coverage area, with each beam being assigned to a sector of one of the BTSs 30a, 30b and having its own set of control and traffic channels to carry signaling and voice data between the system users 18 and the cellular infrastructure segment 12. As the airplane 35 moves in its flight pattern, the beams radiated from the airplane rotate. Therefore, as the system users 18 will "see" a different beam every 45 seconds or so, the cellular infrastructure segment 12 performs a sector to sector handoff of the call to keep the call from being dropped.

When initiating a call, a system user, such as one of the users 18, utilizes the control channels in the beam to signal the MSO 24 to request a call setup. The request is sent from a handset of the user 18 to the airplane payload 22, and then is relayed to the ground converter equipment 32. The ground converter equipment 32 relays the request to the corresponding BTS, such as the BTS 30a. The BTS 30a then transmits the request to the MSO 24, which sets up the call with the PSTN 20. The payload 22 therefore simply extends the physical layer of the BTS 30 to the users 18 to allow a much wider area of coverage than would typically be provided by a conventional terrestrial system, and with less associated infrastructure buildout cost. The airborne system 10 is also preferable for providing temporary cellular coverage for special events areas, where coverage is only needed for several days, thereby eliminating the need and cost associated with erecting cell stations and then tearing the cell stations down after the special events end.

Once the call setup is completed, voice communication with the PSTN 20 through the traffic channels in the beam is initiated, and voice information is then relayed in the same manner as the signaling information. When the call ends, a signal is sent to the MSO 24 to tear down the call, the handset of the user 18 releases the traffic channel used for voice communications, and the channel is returned to an idle state.

Figure 3:
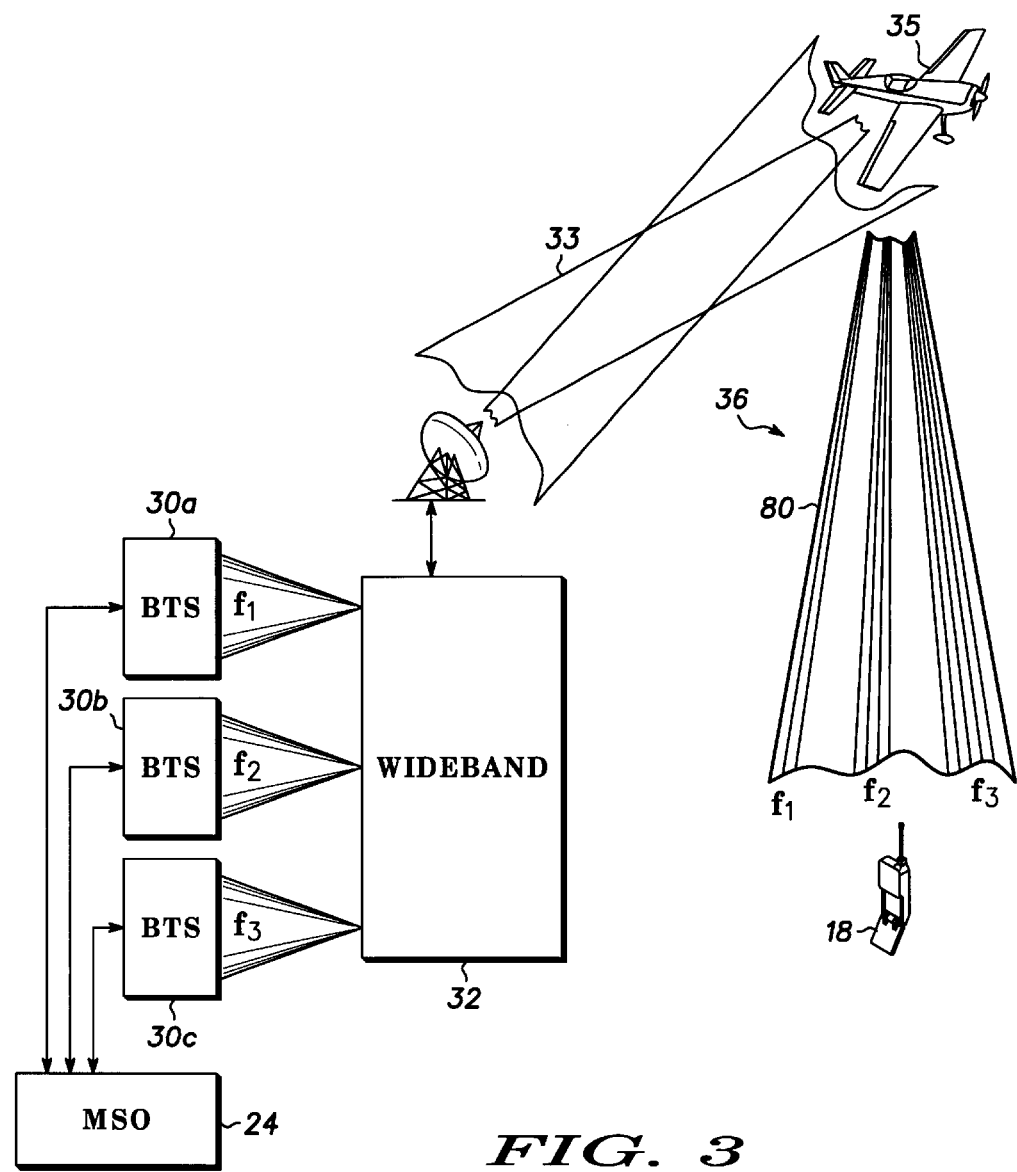
FIG. 3 is a block diagram showing components of the system of FIG. 1 necessary to implement user location techniques in accordance with the present invention.

FIG. 3 shows certain of the components of a system 10, including an additional BTS 30c not previously shown in FIGS. 1 and 2 (any number of BTSs necessary for implementing the airborne cellular system may be included). The components of the system 10 are necessary to implement system user location techniques of first and second embodiments in accordance with the present invention that enable an airborne cellular communications service provider to accurately bill system users and roamers based on their location within the system.

Specifically, each of the sectors of the respective BTSs 30a–30c is dedicated to a unique one of the exemplary beams having associated beam numbers $f_1$, $f_2$, $f_3$ in a beam pattern 80 that is transmitted from the antenna 70 shown in FIG. 2 to the location of active users and that forms the user link 69. Beam number information for each beam is transmitted from the airplane 35 to the ground converter equipment 32 through the feeder link 33. The ground converter equipment 32, upon receiving the beam number information, then creates a pseudo-BTS reference number for each of the beams, and transmits the pseudo-BTS reference numbers to the switch located in the MSO 24. A home location register (HLR) and a visited location register (VLR) in the switch then compare the reference numbers to a list of locations used in a system billing program, and will interpret the reference numbers as though the numbers were BTSs in a conventional terrestrial cellular communications system. As a result, a system user's location within a particular beam can be determined at the MSO 24 based on the beam number information, with the location having an approximate 50 km uncertainty that corresponds generally to the dimensions of the respective beam footprints.

Figure 4:
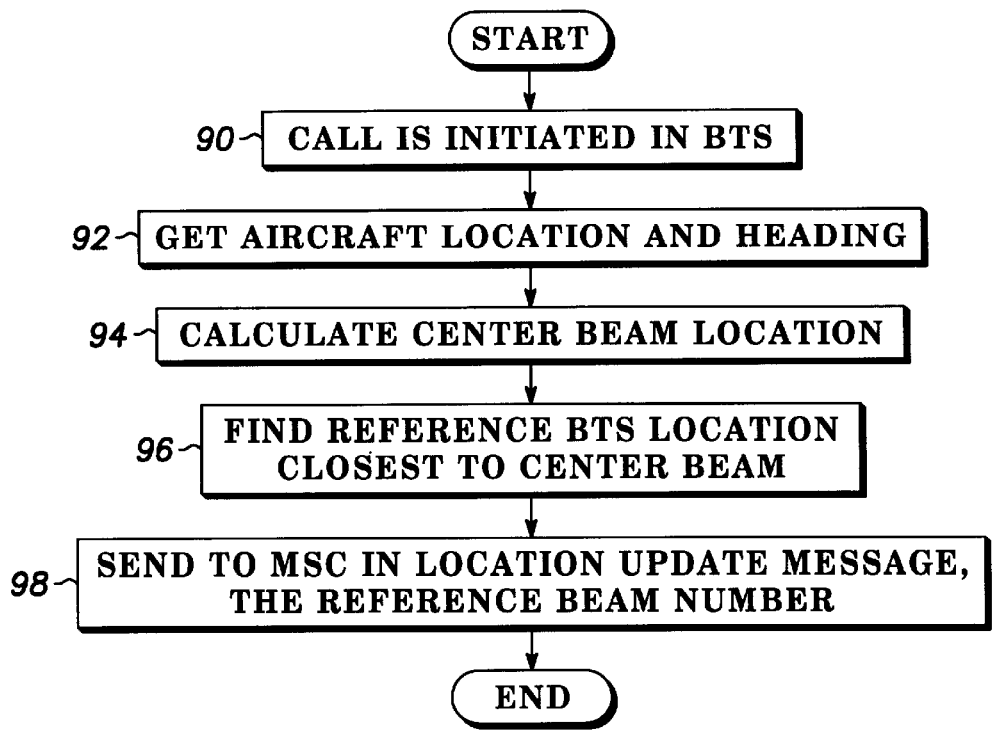
FIGS. 4 and 5 are flow diagrams illustrating the methodologies used in implementing first and second user location techniques of first and second embodiments, respectively in accordance with the present invention.

The methodology utilized to locate a system user based on the geolocation technique of the above-described first embodiment is summarized in the flow diagram in FIG. 4. At 90, a call is initiated in one of the BTSs, such as the BTS 30a. At 92, airplane location and heading data is transmitted from the airplane avionics equipment 58 shown in FIG. 2 via the telemetry link 34 to the MSO 24, where it is used at 94 to calculate a current beam center location. At 96 the HLR and VLR in the switch then compare the calculated beam center location against a list of billing program reference locations to map the calculated beam center location to a closest one of the billing program reference locations. At 98 the closest one of the billing program reference locations is then utilized by the MSC 24 as the system user's current location for the purpose of billing the user at a rate that is commensurate with the user's location.

Figure 5:
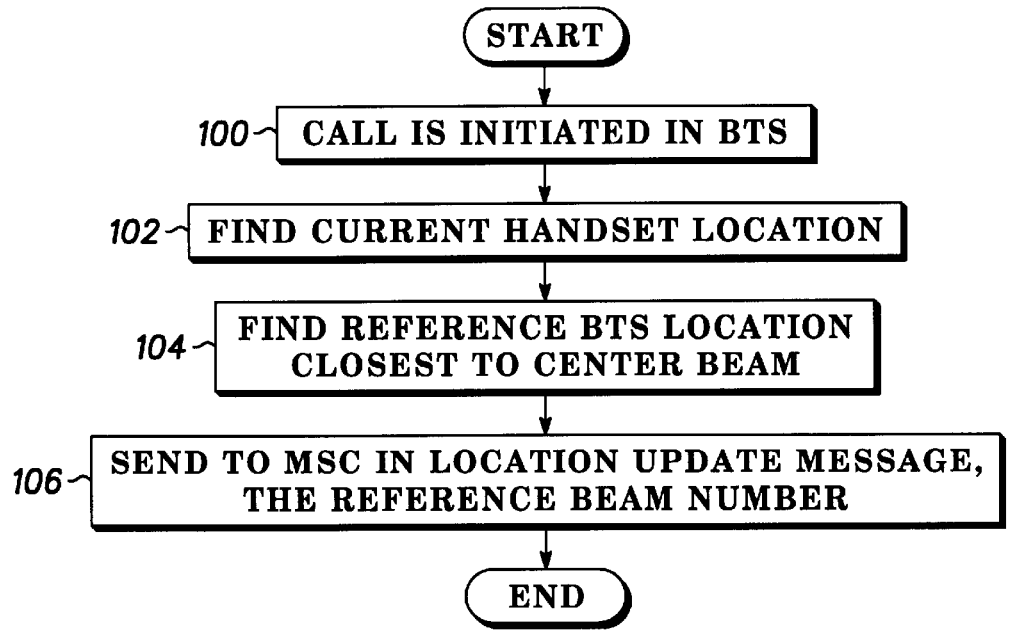

As beam patterns such as the beam pattern 80 are, for example, in the range of 50–75 km in diameter, further segmentation of the beam pattern may be required, depending upon specific system billing or E911 requirements, to more accurately determine the system user's location within a particular beam. In such a case, a system user location methodology that is more refined than that shown in FIG. 4 and as summarized by the flow diagram in FIG. 5 may be utilized. According to the refined system user location methodology, at 100, a call is initiated in one of the BTSs, such as the BTS 30a. At 102, the switch determines the current handset location by calculating the user's radial distance in the beam using a time delay algorithm programmed into the MSC 24. The time delay is measured by the BTS either via a measurement of the code offset (CDMA) or frame delay (TDMA) and then converted to a radial distance based on the airplane geometry with respect to the ground converter equipment 32. At 104 the HLR and VLR then compare the handset location against a list of billing program reference locations to map the handset location to one of the billing program reference locations. At 106 the billing program reference location is then utilized by the MSC 24 to bill the user at a rate that is commensurate with the user's location within the particular beam.

The system user location techniques according to the first and second embodiments described above give a service provider the ability to perform location billing for a cellular communications network including both airborne and terrestrial components. The techniques enable the service provider to generate additional revenue, as system user locations can be more accurately determined and more appropriate billing rates applied, particularly to subscribers of adjacent systems that roam into the coverage area of the system 10.

Figure 6:
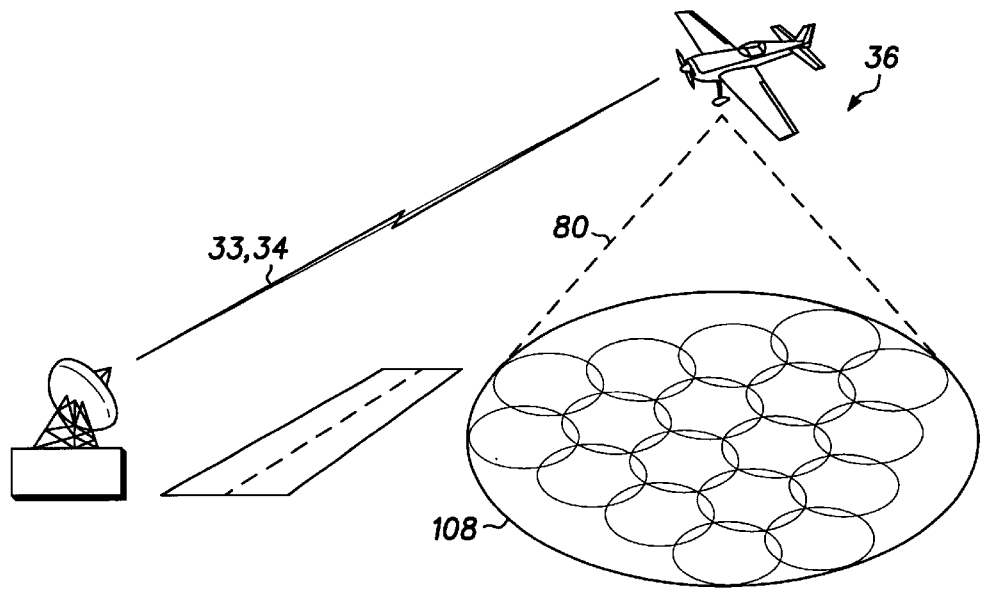
FIG. 6 is a system diagram illustrating communication links and coverage areas of the FIGS. 1 and 2 system in more detail.
Figure 7:
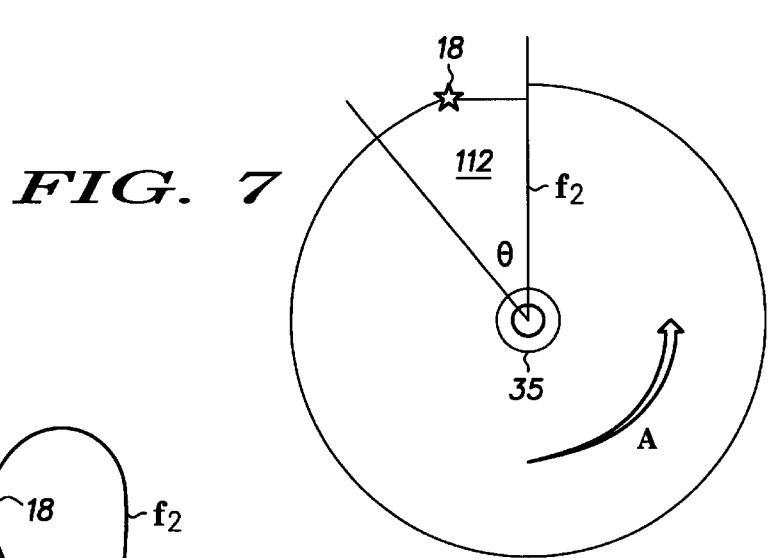
FIG. 7 is a plan view of an airplane flight pattern and corresponding beam pattern transmitted by an airborne cellular communications system repeater carried by the airplane and utilized by a geolocation technique of a third embodiment in accordance with the present invention.
Figure 8:
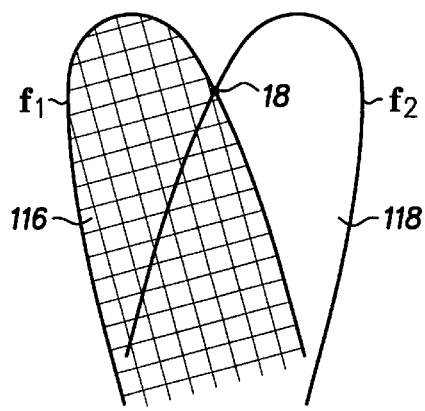
FIG. 8 is a plan view of a hand-off of a system user call occurring between two beams transmitted from the airplane shown in FIG. 1 as the airplane executes its flight pattern.

Referring to FIGS. 6–8, a time delay-based location technique of a third embodiment in accordance with the present invention that may be utilized with the above-discussed second embodiment to achieve even greater accuracy in determining a user's location will now be described. As shown in FIG. 6, the beam pattern 80 transmitted from the antenna 70 results in numerous beams, such as the 18 beams shown generally at 108 that together define a beam pattern footprint that covers a predetermined geographic area that may be, for example, 110 km in diameter when the airplane transmits the beam pattern from an elevation of 30,000 feet. The beams rotate as the airplane executes its circular flight pattern. However, the link 36 remains stationary relative to the system users due to a series of handoffs that occur between, for example, a beam rotating out of a coverage area and a beam rotating into the same coverage area.

More specifically, as shown in FIG. 7, the radial location of a system user 18 located within a footprint 112 of a beam, such as the beam $f_2$, can be determined using the above-discussed time delay algorithm as the airplane 35 executes its flight pattern in the direction indicated by the direction arrow A and as represented by the azimuthal angle $\Theta$. However, the uncertainty associated with the system user's azimuthal location within the beam $f_2$ can be reduced by a factor of 100 compared to the system user location technique described above in connection with the second embodiment by utilizing beam hand-off information to determine the exact azimuthal location of the system user within a particular beam.

As shown in FIG. 8, the system user 18 is shown between projections 116, 118 of two beams, such as beams $f_1$, $f_2$ as the beam $f_1$ forming the footprint 116 rotates out of a coverage area of the user 18 and as the beam $f_2$ forming the footprint 118 rotates into the coverage area. As the system user's radial location is calculated using the above-discussed time delay technique (stored system user radial billing locations are represented by the generally horizontal lines within the beam footprint 116), the switch can determine the system user's azimuthal position within the beam $f_1$ at the time of handoff, as hand-off information indicating the exact point in time at which the hand-off occurs can be transmitted to the switch in the MSC 24 from the BTS and compared to a database of stored system user azimuthal billing locations, represented by the generally vertical lines within the beam footprint 116, to determine the nearest azimuthal billing location to the calculated location. The handoff time is then converted to an azimuthal location by utilizing the current location and heading of the airplane.

It should be appreciated that, as system hand-offs occur periodically, such as only once every 45 seconds, the switch cannot determine the exact location of a system user initiating a call immediately after a beam hand-off until a subsequent hand-off occurs. Therefore, a service provider may initially assign a less expensive rate to a system user's call until the exact location of the system user can be determined after the subsequent beam hand-off occurs 45 seconds later.

In addition, it should be appreciated that the system user location technique of the third embodiment is not applicable to a system center beam that potentially does not hand off calls. However, location within the center beam can be refined using standard triangulation techniques utilizing movement of the airplane to provide spatial diversity. Three different measurements separated in time will each have different ground station, airplane and handset geometry, thereby allowing for triangulation measurement of user location. In other words, three time-separated measurements will appear as three location-separated measurements as the airplane continues to execute its flight pattern. Two of the measurements will isolate the user location to two points within the beam. As the airplane continues to execute its flight pattern, the third measurement breaks the left/right ambiguity created by the first two measurements (unless the third measurement lies on a line connecting the first two measurement points). Therefore, geolocation of a user within a center beam may also be realized.

In view of the foregoing discussion, the system user location techniques of the embodiments in accordance with the present invention enable a system user's location within a particular communications beam to be determined with an accuracy that can be refined to a point determined by specific system billing requirements. In addition, the third embodiment enables a system user's location to be accurately determined based on both its radial and azimuthal location within a specific beam. Such accuracy enables an airborne cellular communications system such as the system 10 to comply with a recent FCC E911 mandate requiring cellular systems to provide a user's location within a 125-meter radius 67% of the time.

While the above description is of the preferred embodiment of the present invention, it should be appreciated that the invention may be modified, altered, or varied without deviating from the scope and fair meaning of the following claims.

What is claimed is:

1. A method of locating a billing area for a call initiated by a system user in an airborne cellular communications system, comprising:

determining a location and heading of an airplane carrying a system repeater;

calculating a center location of a repeater beam in which coverage was initiated;

mapping the center location to a closest corresponding geographic billing location; and associating the call with the closest corresponding geographic billing location.

2. The method of claim 1, wherein the mapping of the center location comprises comparing the center location against a list of stored reference locations used by a billing program.

3. The method of claim 1, wherein the calculating of a center location comprises determining a number associated with the beam that is unique to a specific terrestrial base transceiving station sector, and using the beam number to create a pseudo-base transceiving station for a terrestrial infrastructure to enable infrastructure components to interpret beam information as originating from a terrestrial base transceiving station.

4. The method of claim 1, wherein the associating of the call is performed for an entire duration of the call.

5. The method of claim 1, wherein the mapping of the center location provides accuracy to within approximately 50 km.

6. A method of determining a location of a handset within a coverage area of a cellular communications system having an airborne repeater, comprising:

determining a propagation delay and a beam number associated with a call;

mapping the propagation delay and the beam number to a geographic location;

determining an azimuthal position based on a handoff of the call caused by rotating coverage beams; and refining the geographic location determined from the mapping of the propagation delay and the beam number based on the azimuthal position.

7. The method of claim 6, further comprising using a triangulation technique utilizing system ground station, airplane and handset geometries determined at three different measurement times if a handset is located in a central system location.

8. The method of claim 6, further comprising maintaining accuracy of the geographic location by monitoring subsequent call handoffs.

9. The method of claim 6, further comprising using the geographic location determined from the refining of the geographic location for emergency purposes.

* * * * *